Patented Nov. 6, 1951

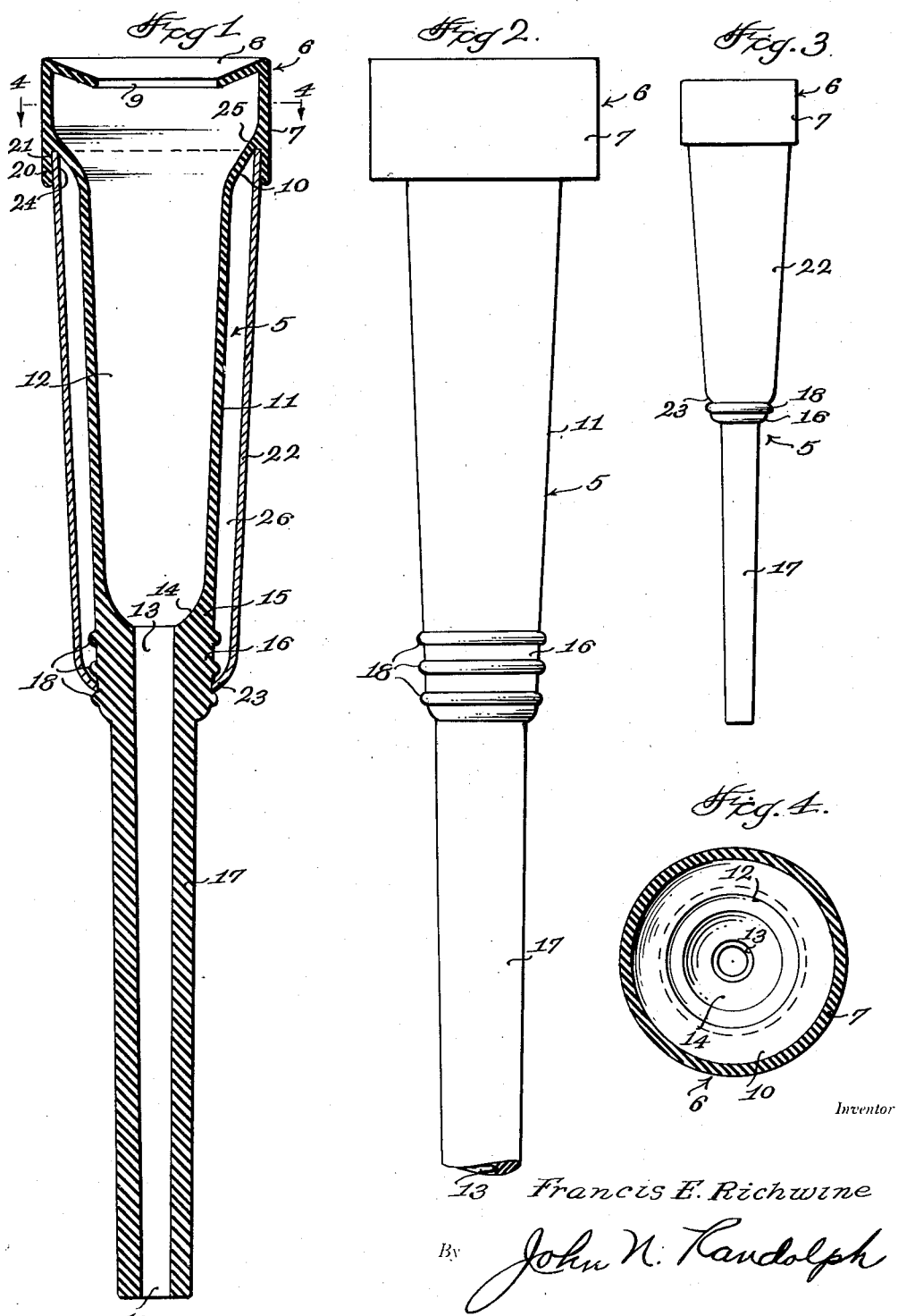

2,574,063

UNITED STATES PATENT OFFICE 2,574,063

TEAT CUP LINER FOR MILKING MACHINES

Francis E. Richwine, Indianapolis, Ind.

Application October 7, 1949, Serial No. 120,169

1 Claim. (Cl. 119—14.49)

This invention relates to a novel construction of teat cup liner for use with suction type milking machines and more particularly to a liner of integral construction formed of a relatively elastic material, preferably synthetic rubber and which will possess a high degree of durability and uniformity in its operation and, being less porous, may be easier maintained in a clean and sanitary condition.

Still a further object of the invention is to provide a teat cup liner, preferably formed of synthetic rubber and which will maintain its shape for a longer period than liners formed of other elastic materials.

When a cow's udder is washed with water at a temperature of approximately 130° Fahrenheit an internal secretion is produced which expands and opens the tiny milk cells in the udder, the interior of which is similar in function to a sponge and which immediately produces milk. As this internal secretion or hormone lasts for only a few minutes, it is essential that the cow be milked promptly and rapidly to obtain the maximum milk production. Accordingly, it is a primary object of the present invention to provide a liner of sufficient strength to draw the milk from the upper part of the cow's udder, not reached by the suction of conventional liners and while employing the same suction as is conventionally provided by milking machines, to thereby not only obtain a greater milk production but to secure delivery of the milk which is in the upper part of the udder and which contains a larger percentage of butterfat and to thereby milk the cow cleaner or more completely while the internal secretion or hormone is functioning and to draw the milk from the udder as it is fed down, which is not accomplished by conventional liners.

Another object of the invention is to provide a liner which through obtaining a faster and more complete milking operation minimizes stripping and prevents mastitis due to the fact that swelling and inflammation is drawn out much more rapidly by the present invention.

A further object of the invention is to provide an improved liner which will enable a greater quantity of milk to be obtained in a shorter milking time and with a shorter time required to prepare the udder thereby reducing the amount of labor involved in each milking operation.

Various other objects and advantages of the invention will hereinafter become more fully apparent from the following description of the drawing, illustrating a presently preferred embodiment thereof, and wherein:

Figure 1 is a longitudinal, central sectional view showing the liner with the teat cup shell applied thereto;

Figure 2 is a side elevational view of the liner, with the shell removed;

Figure 3 is a side elevational view on a reduced scale showing the liner with the shell applied, and Figure 4 is a cross sectional view through the upper portion of the liner taken substantially along a plane as indicated by the line 4—4 of Figure 1.

Referring more specifically to the drawing, the teat cup liner, comprising the invention is designated generally 5 and is of integral construction throughout, preferably being formed of synthetic rubber because such material possesses sufficient elasticity to accomplish the intended purpose of the liner and is less porous and will maintain its elasticity for a longer period than natural rubber.

The liner 5 includes a head portion, designated generally 6 including an outer, substantially cylindrical portion 7, preferably of approximately one-eighth inch thickness and having a diameter of approximately one and seven-eighths inches and a length slightly in excess of one inch. The cylindrical wall, at its upper end, has an inwardly and downwardly extending integral annular flange 8 defining an opening in the top of said head, designated 9, which is approximately one inch in diameter and which is surrounded by the annular dish-shaped flange 8. The head 6 also includes an integral internal annular downwardly tapered portion 10 which extends inwardly and downwardly from the cylindrical wall portion 7 and the upper, enlarged end of which is preferably disposed slightly beneath a point intermediate of the upper and lower ends of said cylindrical wall 7. The lower, restricted end of said downwardly tapered or frusto-conical portion 10 terminates at approximately the level of the bottom edge of the cylindrical wall 7 and at its lower end has an internal diameter of approximately one and one-sixteenth inches.

The liner 5 also includes an elongated substantially cylindrical portion 11 which is internally and externally tapered from its upper to its lower end and the upper end of which merges integrally with the restricted lower end of the frusto-conical portion 10 and accordingly has an internal diameter, preferably of approximately one and one-sixteenth inches. Said tapered portion 11 defines the teat receiving chamber 12 which tapers in diameter from its upper to its lower end and which communicates at its lower end with the upper end of a discharge bore 13 of a greatly reduced diameter. The lower end of the teat receiving chamber 12 is sharply reduced in diameter adjacent to where it opens into the bore 13 by the annularly reduced portion 14 and as the external taper of the teat receiving portion 11 is uniform, the thickness of the lower part 15 of the teat receiving portion 11 is substantially greater than the thickness of the remainder of said portion 11 and the frusto-conical portion 10, each of which is preferably of approximately the same thickness as the head 6, so as to possess a relatively high degree of flexibility and elasticity.

The external taper of the portion 11 continues to below its lower end to provide a relatively thick portion 16, directly beneath the thickened portion 15 and in which the upper end of the discharge bore 13 is formed and which portion 16 preferably has a radial thickness of approximately 13/32nds of an inch. Said portion 16 constitutes the upper end of the discharge tube 17 which forms the lower end of the liner 5 and an integral continuation of the teat receiving portion 11. Said portion 16 is provided with a plurality, preferably three, annular external enlargements or rings 18 which are formed integral therewith and which are preferably spaced approximately a quarter of an inch apart. The discharge bore 13 preferably extends from end-to-end of the tube 17 and including its externally thickened portion 16 and adjacent the teat receiving chamber 12 is approximately three-eighths of an inch in diameter and tapers gradually toward its opposite, discharge end 19. Likewise, the external diameter of the discharge tube 17 preferably is tapered slightly and to approximately the same degree as the bore 13 toward its discharge end 19 and is of a radial thickness substantially greater than the thickness of the portion 11 but substantially less than the thickness of the portion 16, as clearly illustrated in Figure 1.

The portion of the annular wall 7, below the upper enlarged end of the frusto-conical portion 10, constituting an annular apron 20, combines with said frusto-conical portion 10 to form an external downwardly opening annular channel or groove 21 the inner wall of which is disposed in downwardly and inwardly converging relationship to its outer wall, as clearly illustrated in Figure 1.

A teat cup shell 22 which may be formed of any suitable, substantially rigid material such as metal is adapted to be detachably mounted on the liner 5 for retaining the upper portion of said liner in an extended, stretched position. The shell 22 is in the form of a sleeve which is tapered from its upper to its lower end and which terminates at its lower, restricted end in an inturned annular restricted portion 23. The shell 22 is removably applied to the liner 5 over the lower discharge end 17 thereof and the enlarged upper end 24 of said shell is of a proper diameter to fit into the downwardly opening groove 21 and abuts against the restricted bed portion of said groove, as seen in Figure 1 and bears against the apron 20. The head 6, directly above the bed of the groove 21 is radially thickened, as seen at 25 due to the fact that the downwardly tapered annular wall 10 extends from said portion of the cylindrical wall 7 so that the thickened head portion 25 reinforces the head where it is engaged by the upper, enlarged end of the shell 22. The opening defined by the lower inturned restricted end 23 of the shell 22 is of approximately the same diameter as the external diameter of the liner portion 16 and said portion 16 is sufficiently resilient so that the lowermost ring or enlargement 18 may be drawn through the lower end of the shell by pressing said portion 16 and so that said inturned shell portion 23 will bear on the upper side of the lower enlargement 18. As the length of the shell is greater than the normal distance between the bed of the groove 21 and the lower enlargement 23, the teat receiving portion 11 will be stretched longitudinally by the shell 22 and retained thereby under tension and this longitudinal stretching of the liner portion 11 by the shell 22 eliminates the necessity of attaching weights to the liner or shell, as is a common practice.

The discharge end 19 of the tube portion 17 is connected in a conventional manner to a milking machine. The teat is inserted into the liner through the opening 9 in the head 6 and is received in the downwardly tapered teat chamber 12 the upper end of which is slightly larger in diameter than said opening 9 so that the liner will be prevented from moving up on the teat during the milking operation. The concave or dished annular portion 8 of the head 6 is disposed against or adjacent the udder and has a close fitting engagement around the teat to prevent loss of suction in the chamber 12. The liner 5 is intended to be used with conventional milking machines wherein a fluctuating suction is provided and as a suction is created in the bore 13 and chamber 12 by the milking machine, the longitudinally tensioned relatively thin and elastic liner portion 13 will be drawn inwardly by this suction to exert a squeezing and downward pulling action on the teat. This inward movement of the liner portion 11 will be relatively to the shell 22 and will thereby increase the size of the closed chamber 26 between the shell and liner and which is sealed at its ends by the head 6 and liner portion 16 so that as the liner portion 11 is drawn inwardly the chamber 26 will be enlarged and a vacuum created therein. As a result, when the suction from the machine momentarily is diminished or eliminated the vacuum in the chamber 26 will cause the portion 11 to expand back to its normal position of Figure 1 for releasing the pressure on the teat as in a hand milking operation.

To have the liner properly tensioned by the shell, the shell 22 is made 5¾ inches in length while the liner 5 between the bed of the groove 21 and the lower enlargement 18 is 4½ inches in length. The additional enlargements 18, which are spaced approximately one-quarter of an inch apart, are provided so that after the upper portion of the liner 5 has lost some of its elasticity through being held under tension by the shell 22, the liner portion 16 may be drawn downwardly through the lower end 23 of the shell to cause said lower end to engage either the intermediate or upper enlargement 18 for maintaining the liner portion 11 under proper tension.

Various modifications and changes are contemplated and may obviously be resorted to, without departing from the spirit or scope of the invention as hereinafter defined by the appended claim.

I claim as my invention:

1. A teat cup liner comprising an enlarged head defining the upper end thereof including a cylindrical wall having an inturned annular flange at its upper end forming a central teat receiving opening, a frusto-conical portion, forming a part of said head and extending inwardly and downwardly from the intermediate portion of said cylindrical wall and terminating in radial alignment with the lower end of the cylindrical wall, said head and frusto-conical portion combining to form an annular downwardly opening groove, a rigid sleeve-like teat cup shell having an upper end engaging in said groove, a sleeve-like teat receiving portion of uniform thickness having an upper end merging integrally with the lower, restricted end of said frusto-conical portion and defining a teat receiving chamber extending longitudinally through the shell and which is spaced therefrom, said teat receiving portion being uniformly tapered internally and externally from its upper to its lower end, a discharge tube having an upper end formed integrally with the lower end of said sleeve-like teat receiving portion and having a restricted bore extending longitudinally therethrough and opening at its inner end into the restricted end of the teat receiving chamber, and said discharge tube being externally enlarged at its upper end to provide an uninterrupted continuation of the exterior surface of the teat receiving portion and being provided with longitudinally spaced external enlargements adapted to selectively abut the restricted opposite end of the teat cup shell for combining with said annular groove for anchoring and sealing the liner to the shell for maintaining the teat receiving portion thereof under tension and for providing a sealed space between the shell and teat receiving portion.

FRANCIS E. RICHWINE.

REFERENCES CITED

The following references are of record in the file of this patent:

UNITED STATES PATENTS

| Number | Name | Date |
|---|---|---|
| 1,690,327 | Dinesen | Nov. 6, 1928 |
| 1,839,765 | Knox | Jan. 5, 1932 |
| 1,955,810 | Hodson | Apr. 24, 1934 |
| 2,300,833 | Scott | Nov. 3, 1942 |
| 2,340,295 | Bender | Feb. 1, 1944 |
| 2,484,696 | Dinesen | Oct. 11, 1949 |
| 2,502,956 | Jansson | Apr. 4, 1950 |

FOREIGN PATENTS

| Number | Country | Date |
|---|---|---|
| 285,233 | Great Britain | Feb. 16, 1928 |
| 59,073 | Denmark | Sept. 29, 1941 |